N. DAHL.
PROCESS OF REFRIGERATING FISH, &c.
APPLICATION FILED JULY 1, 1912.
1,123,701.
Patented Jan. 5, 1915.
2 SHEETS—SHEET 1.
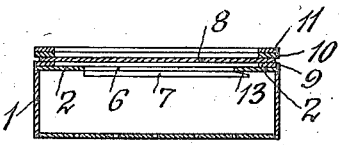
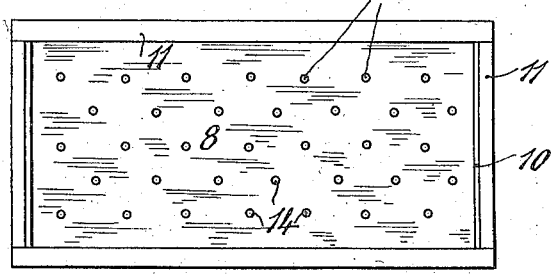
Witnesses:
John C. Sanders
Albert F. Neuman
Inventor:
Nekolai Dahl.
Attorney

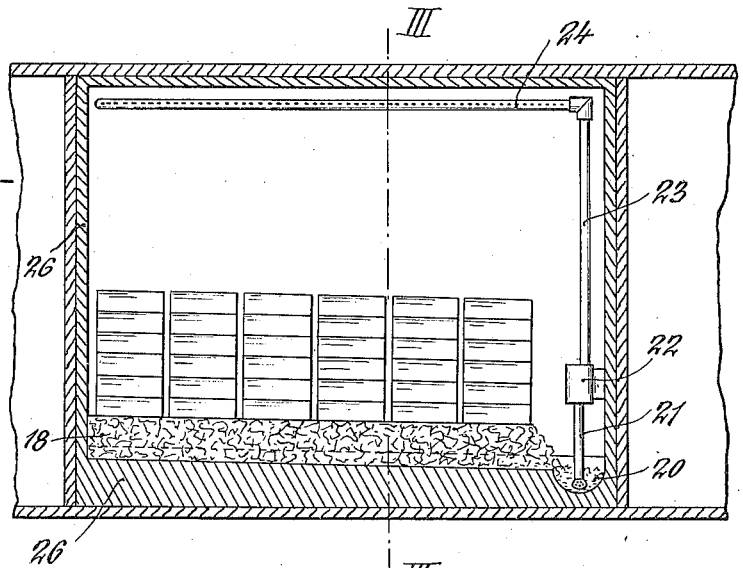
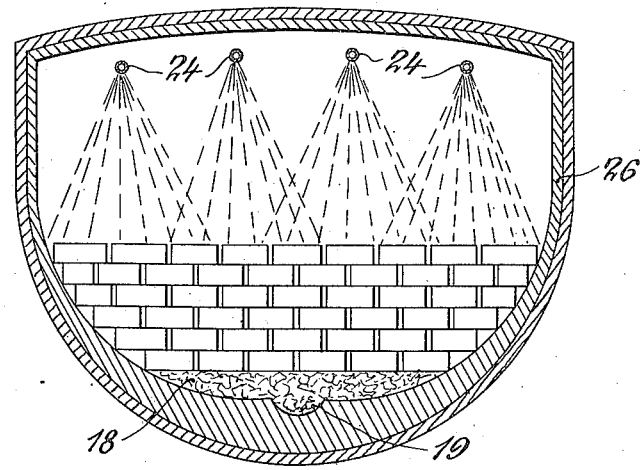
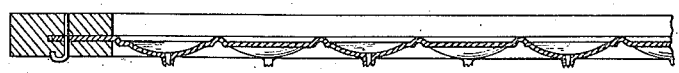

UNITED STATES PATENT OFFICE.

NEKOLAI DAHL, OF TRONDHJEM, NORWAY.

PROCESS OF REFRIGERATING FISH, &c.

1,123,701. Specification of Letters Patent. Patented Jan. 5, 1915.

Application filed July 1, 1912. Serial No. 707,029.

*To all whom it may concern:*

Be it known that I, NEKOLAI DAHL, merchant, of Norway, residing at Fjordgaten 49, Trondhjem, Norway, have invented new and useful Improvements in Processes of Refrigerating Fish, &c., of which the following is a specification.

According to previously known methods it has been tried to preserve fresh herring and fish during transport and storing either by placing ice in or on the article itself or by cooling the air itself by mechanical freezing rooms or by means of a freezing mixture—ice and salt—and a system of pipes through which the liquid from the freezing mixture circulates to thereby cool the air in the freezing or storage room, or finally by causing the air to pass directly through a freezing mixture and afterward conducting the cooled air into the room, all for the purpose of preserving the article against decay. Long ago, however, experience has shown that the first method—of placing ice in or upon the article itself—has an injurious effect, thereby *inter alia* incurring the risk that the article is jammed, loses its fresh appearance and is greatly deteriorated with respect to its commercial value. The other above mentioned methods by which it is tried to preserve the article fresh by causing cooled air to freeze it, also involves several inconveniences. Herring or fish, which is exposed to the cooled dry draft of air, will dry up and the skin will shrink the article stiffening at the same time. The blood water and slime, which attend the herring or fish, will also dry, the article turning gray and getting an appearance, which is not appetizing. Thus its commercial value is highly reduced also in this case. Nor will the cooled air be able to completely penetrate the article or mass. It will only be the top layer that freezes, and the end is not attained. The main purpose with all these methods is to get the article thoroughly frozen to thereby preserve it fresh for some length of time, but, as above explained, it is not possible to do this by the methods hitherto known, while some of these may advantageously be employed, when the article is frozen beforehand. The point therefore is to find a method, enabling the article to be thoroughly frozen in the shortest time possible, while it is still fresh, and moreover to preserve its fresh appearance, so that its commercial value will not be impaired, at the same time enabling the article to be kept frozen for some length of time.

Such a method forms the object of the present invention and consists in causing a liquid (cold brine) to trickle down between the article from a point above the box or the freezing room (store, railway wagon, the hold of a vessel, etc.) in which the article is kept, thereby keeping the same constantly cooled, while at the same time the liquid supplied has in itself a preserving effect. Care should be taken to provide an outlet for the liquid at the bottom, either for the purpose of discharging it, or—after renewed cooling and cleaning—to again cause it to trickle through the article in the freezing room. In this manner the article will be thoroughly frozen in quite a short time, without losing its fresh appearance, and thus without its commercial value being impaired. This is suitably and most advantageously attained by placing a freezing mixture—ice and salt—at the bottom of the storage room for instance the hold of a steamer, and utilizing the cooling and preserving qualities of the liquid, generated from said mixture. Said liquid, while at the same time thoroughly freezing the article in a short time, will supply the same with the suitable quantity of saline substance so as to make it more adapted for smoking treatment. During the trickling of the cold brine downward between the article said brine partially freezes into ice (while precipitating the salt) so that for instance in a herring box there will be formed small ice molds in the spaces between the fish. Accordingly it is found that this method enables the fish to be thoroughly frozen not only in the outermost layers but all through, the cold brine having a far greater penetrating power than for instance cold air. This method can be employed in all cases, where articles are concerned which can stand water, specially fish. The method, however, is primarily intended to keep fresh herring cooled and preserve it in boxes during wholesale export, but it may also advantageously be employed in freezing wagons in railways, in fishing vessels during transport of the fish from the fishing place to the dealer, in storage rooms, etc.

Different applications of the invention will be hereinafter described reference being had to the accompanying drawings, in which:

Figure 1 is a cross-section and Fig. 2 a plan view of a herring box with a cover thereon. Fig. 3 is a portion of a longitudinal section of a vessel showing the application of the invention in the hold of a vessel. Fig. 4 is a cross-section on the line III—III of Fig. 3. Fig. 5 shows a detail of a metal cover on a larger scale.

On the top of the boxes —1— is secured by nails two narrow boards —2—, between which the cover fits in, its cross bars engaging below one of the fixed boards —2—. A list —7— underneath the list —6— is attached to the underside of the cover and engaging between the fixed boards —2—, said list —7— engaging between the gable walls of the box and preventing a displacement of the cover. The cover itself consists of an outer wooden frame —9, 10, 11— and a plate —8— secured in the same and made of zinc, galvanized sheet iron or similar durable metal or of metal coated with strong enamel paint (for instance "ripolin"). The plate may also consist of wood or be composed of wooden lists carrying wire-netting or other material. Essential is only that this plate shall form between the fish and the freezing mixture on the cover a partition penetrable to water. The most suitable material for a cover surface is a thin metal plate. The latter gives many advantages. The plate, which is an excellent cooling surface, is pressed into such a shape as to conduct the freezing mixture from the wooden frame (or the outer edges of the plate) inwardly toward its middle portion, which is provided with several rows of apertures —14—. It is, however, of the greatest importance that said apertures should have been so made that the cooling and preserving liquid which has passed through the same, immediately after having passed through will drip straight down into the box and not flow along the underside of the plate —8— and afterward down along the walls of the box without penetrating through the article. In this latter case the cooling capacity of the cold brine would be lost. To prevent this, the holes in the plate —8— are made funnel-shaped or their underside is provided with a comparatively large depending bur. In the plate may also be pressed a large number of closely arranged recesses at the bottom of which the holes are formed. Or the metal plate may be provided with ribs, which, besides conducting the freezing mixture to the holes, will also strengthen the plate itself, all as indicated in Fig. 5. When the boxes are placed one on top of the other, abundantly supplied with a freezing mixture, the cover will take up the pressure of the overlying boxes and not press against the article as in previous methods. The bottom of the box may, as indicated in the drawings, consist of wooden boards secured by nails with intervening spaces, or of some other perforated material, so that the liquid can be utilized for the underlying boxes, or, if it is found more convenient, the water may be conducted away from the bottom of the box and out through to the side walls.

In the device above described, the melting liquid from a mixture of ice and salt placed upon the cover may be utilized as a freezing mixture, and this liquid contains such a degree of cold, that the herring will immediately be cooled by the brine flowing through it, while at the same time it is kept suitably salt for smoking purposes. Another great advantage of these covers is that in reloading and reicing at the reloading stations, where up to 1000 boxes an hour are reiced, the necessity of removing the cover from the box is done away with thereby gaining much time. Nor is the article exposed to the air which is the case in reicing according to the old method in which the covers were removed and the ice placed directly on the herring. Thus when using the covers described above, the herring is supplied with salt and low temperature in an automatically controlled manner more suitable, economical and easy than in methods previously known.

To secure the cover in position on the box, the lists —7— hereinbefore referred to are extended at one end, forming inclined lips —13— engaging below the fixed board —2—, as indicated in Fig. 1.

If the method is to be employed for instance in a fishing transport vessel the boxes or the fish may rest on an ice-and-salt mixture —18— placed at the bottom of the hold of the vessel, as indicated in Figs. 3 and 4, the cold brine molten from the mixture being suitably conducted by an inclined chute —19— at the bottom down into a collecting recess —20— into which projects the suction pipe —21— from a pump —22—, whereby the liquid is sucked up to be conducted through a pipe —23— to the top of the hold and to be caused by means of two or more longitudinal pipes —24—, provided with holes, by a hose, or in some other manner to trickle uniformly down over the herring boxes —25— placed on top of the ice-and-salt mixture.

To prevent the liquid from having a destructive effect on the walls of the vessels and to keep the hold perfectly tight, the walls are provided with a suitable sheathing or lining —26— and with an insulation.

In the recess —20— the mud and dirt which may have been carried along with the liquid, may gather, and the suction pipe —21— of the pump may be provided at its bottom with a sieve or a filtering apparatus preventing the dirt from being sucked up into the trickling system.

The easiest, most economical, and convenient arrangement is to place the ice-mixture at the bottom, for by this arrangement the freezing mixture is exposed to a constant and great pressure from the cargo whereby the liquid is formed more quickly, and its freezing energy will be greater and its action more efficient. After the liquid has trickled through the article, it returns to the freezing mixture where it is again cooled and utilized anew. Thus in this arrangement a constant circulation is obtained.

It is obvious that it is not necessary to use ice and salt for a freezing mixture. Other freezing mixtures may also come into consideration, the only conditions being that the liquid circulating through the article shall have a temperature below 0 degrees centigrade and possesses preserving qualities with respect to the article in question, that such liquid shall have a preserving effect without involving inconveniences of any kind. The same result is also obtained if a preserving liquid, the freezing point of which lies below 0 degrees centigrade, is cooled, before passing through the article by flowing through a cooling system for instance a mechanical freezing apparatus.

Having now described my invention, what I claim as new and desire to secure by Letters Patent is:—

1. Method of cooling and freezing fish and other articles of food, especially during transport, by the use of a cooling liquid in direct contact with the article or its several parts, which consists in inserting the article in its natural unfrozen condition into the actual packing in which it is to be stored or transported, and causing the cooling liquid having a temperature below 0 degrees centigrade to circulate through the packing and between the articles contained therein until the article has been cooled and frozen throughout.

2. Method of cooling and freezing fish and other articles of food, especially during transport, by the use of a cooling liquid in direct contact with the article or its several parts, which consists in inserting the article in its natural unfrozen condition into the actual packing in which it is to be stored or transported, causing the cooling liquid having a temperature below 0 degrees centigrade to circulate through the packing and between the articles contained therein until the article has been cooled and frozen throughout, recooling the liquid and causing the recooled liquid to circulate through the packing and between the articles contained therein.

In testimony whereof I have signed my name to this specification in the presence of two subscribing witnesses.

NEKOLAI DAHL.

Witnesses:
 SWEN BERG,
 W. ROMINY.